(12) United States Patent
Schroder (10) Patent No.: US 11,598,382 B2
(45) Date of Patent: Mar. 7, 2023

(54) ADAPTIVE CENTRIFUGAL BRAKE ASSEMBLIES

(71) Applicant: Pella Corporation, Pella, IA (US)

(72) Inventor: Paul Schroder, Pella, IA (US)

(73) Assignee: PELLA CORPORATION, Pella, IA (US)

( * ) Notice: Subject to any disclaimer, the term of this patent is extended or adjusted under 35 U.S.C. 154(b) by 29 days.

(21) Appl. No.: 16/922,474

(22) Filed: Jul. 7, 2020

(65) Prior Publication Data
US 2021/0010547 A1 Jan. 14, 2021

Related U.S. Application Data (60) Provisional application No. 62/873,331, filed on Jul. 12, 2019.

(51) Int. Cl.
*F16D 59/00* (2006.01)
*F16D 59/02* (2006.01)
*F16D 127/00* (2012.01)
*F16D 129/04* (2012.01)

(52) U.S. Cl.
CPC ........ *F16D 59/00* (2013.01); *F16D 2127/002* (2013.01); *F16D 2129/043* (2013.01)

(58) Field of Classification Search
CPC .............. F16D 59/00; F16D 2127/002; F16D 2129/043
USPC ........................................................ 188/185
See application file for complete search history.

(56) References Cited

U.S. PATENT DOCUMENTS

| | | | |
|---|---|---|---|
| 1,459,394 A * | 6/1923 | Gent ....................... | F16D 43/18 188/185 |
| 2,139,763 A | 12/1938 | Martin | |
| 2,272,168 A | 2/1942 | Franks | |
| 2,388,946 A | 11/1945 | Beall | |
| 2,626,033 A * | 1/1953 | Lewis ..................... | F16D 43/18 192/105 BA |
| 2,685,946 A | 8/1954 | Pferd et al. | |
| 3,367,463 A * | 2/1968 | Armstrong .............. | F16D 43/18 192/105 CD |
| 3,618,726 A * | 11/1971 | Sugahara ................ | F16D 49/14 192/85.13 |
| 3,738,456 A | 6/1973 | Russell et al. | |
| 3,779,355 A * | 12/1973 | Okuno .................... | F16D 43/18 192/105 BA |
| 4,192,412 A | 3/1980 | Stoner | |
| 4,653,609 A | 3/1987 | Devine | |
| 4,653,620 A * | 3/1987 | Czajkowski ............ | F16D 43/18 192/17 R |

(Continued)

FOREIGN PATENT DOCUMENTS

| AU | 2010223029 B2 | 9/2010 |
|---|---|---|
| CN | 101780910 A | 7/2010 |

(Continued)

*Primary Examiner* — Melody M Burch
(74) *Attorney, Agent, or Firm* — Armstrong Teasdale LLP (57) ABSTRACT

An adaptive centrifugal brake assembly is disclosed. The adaptive centrifugal brake assembly controls rotational speed of a shaft. The brake assembly is adaptive and changes braking force based at least in part on torque applied to the shaft and/or the speed of rotation of the shaft. In some embodiments, the adaptive centrifugal brake assembly includes an adaptive mechanism such as a leaf spring that enables the assembly to be adaptive.

11 Claims, 5 Drawing Sheets

(56) References Cited

U.S. PATENT DOCUMENTS

| | | |
|---|---|---|
| 4,938,435 A | 7/1990 | Varner et al. |
| 5,279,400 A * | 1/1994 | Riggle ................ F16D 41/067 |
| | | 192/45.016 |
| 5,341,907 A | 8/1994 | Yokocho et al. |
| 5,967,443 A | 10/1999 | Green |
| 8,002,091 B2 * | 8/2011 | Chabrut ................ F16D 43/18 |
| | | 188/181 A |
| 8,757,324 B2 | 6/2014 | Renton et al. |
| 9,027,717 B2 | 5/2015 | Hult |
| 9,474,918 B2 | 10/2016 | Larsson et al. |
| 9,518,415 B2 | 12/2016 | Hsieh |
| 9,551,386 B2 | 1/2017 | Polito et al. |
| 10,065,053 B2 | 9/2018 | Verstegen et al. |
| 10,208,816 B2 | 2/2019 | Keck |
| 10,208,818 B2 | 2/2019 | Jacobson |
| 2007/0261921 A1 | 11/2007 | Gal et al. |
| 2008/0142296 A1 | 6/2008 | Jean |
| 2008/0263886 A1 | 10/2008 | Kang |
| 2010/0059319 A1 | 3/2010 | Aguado et al. |
| 2018/0304104 A1 | 10/2018 | Auston et al. |

FOREIGN PATENT DOCUMENTS

| | | | |
|---|---|---|---|
| CN | 204387158 U * | 6/2015 | |
| CN | 205099138 U | 3/2016 | |
| CN | 106365013 A | 2/2017 | |
| CN | 208010803 U | 10/2018 | |
| CN | 208182390 U | 12/2018 | |
| GB | 790175 A | 2/1958 | |
| IN | 269765 A | 8/2007 | |
| IN | 200606829 A | 8/2007 | |
| IN | 201405472 P1 | 3/2015 | |
| JP | 3857315 A | 10/1999 | |
| JP | 2010051473 A | 3/2010 | |
| WO | 9708473 A1 | 3/1997 | |
| WO | 2009144706 A1 | 12/2009 | |
| WO | 2013049973 A1 | 4/2013 | |

* cited by examiner

ADAPTIVE CENTRIFUGAL BRAKE ASSEMBLIES

CROSS-REFERENCE TO RELATED APPLICATION

This application claims the benefit of U.S. Provisional Patent Application No. 62/873,331, filed Jul. 12, 2019, which is incorporated herein by reference in its entirety.

FIELD OF THE DISCLOSURE

The field of the disclosure relates to centrifugal brake assemblies for controlling the rotational speed of a shaft, and more particularly to centrifugal brakes that are adaptive and change braking force based at least in part on torque applied to the shaft and/or the speed of rotation of the shaft.

BACKGROUND

Centrifugal brake systems are used to limit the rotational speed of a shaft that extends into the brake. Centrifugal brake systems may use a one or more rotatable weights which are driven outward by centrifugal force into frictional engagement with a stationary drum. The frictional force generated between the pair of rotatable weights and the drum act to oppose the direction of rotation of the shaft, thereby slowing down or controlling the rotational speed of the shaft. The rotatable weights may be restrained in their outward movement by the use of tension springs attached between the rotatable weights. The speed of the centrifugal brake may be in part controlled by the stiffness constant of the spring. Specifically, springs with a high stiffness constant may allow the centrifugal brake to have a higher peak speed relative to springs with a lower stiffness.

Loads applied to the shaft, such as applied torques, may contribute to the rotational speed of the shaft and the centrifugal brake. Improved speed regulation may be advantageous to maintain a rotational speed of the shaft, relatively consistently, for various loads applied to the shaft.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to an adaptive centrifugal brake assembly. The adaptive centrifugal brake assembly includes a center hub and one or more flyweights. Rotation of the center hub causes the flyweights to rotate. A leaf spring is disposed between the center hub and the one or more flyweights. The centrifugal brake assembly includes a drum. The center hub, one or more flyweights, and leaf spring are disposed within the drum. The drum has an inner surface. One or more friction members contact the inner surface of the drum upon rotation of the center hub.

Another aspect of the present disclosure is directed to an adaptive centrifugal brake assembly. The centrifugal brake includes a shaft and a center hub connected to the shaft. The centrifugal brake includes one or more flyweights. Rotation of the center hub causes the flyweights to rotate. A biasing member is connected to the center hub and contacts a flyweight.

Yet another aspect of the present disclosure is directed to an adaptive centrifugal brake assembly. The brake assembly includes a center hub and one or more flyweights. Rotation of the center hub causes the flyweights to rotate. The brake assembly includes a drum. The center hub and flyweights are disposed within the drum. The drum has an inner surface. One or more friction members are connected to the flyweights. The friction members are in contact with the inner surface of the drum as the center hub rotates. The brake assembly includes an adaptive mechanism that non-linearly varies a force applied to the drum by the friction members based on a moment applied to the center hub.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Provisions of the present disclosure relate to generally to an adaptive brake assembly for controlling the rotational speed of a shaft. The brake assembly may generally be used in any application in which it is desirable to passively govern the speed of a shaft driven by variable input torques. For example, the adaptive brake assembly may be used with an escape system in which an individual may descend from a height using a rope or cable wound about the shaft. The adaptive brake assembly controls the rotational speed of the shaft, thereby controlling the speed of descent of individuals of various bodyweights. More generally, the adaptive centrifugal brake assembly may be used to control the rotational speed of a shaft for a variety of applications, for example, the adaptive brake may be used to control the rotational speed of a drive shaft or the rotational speed of a wheel.

An example adaptive brake assembly 100 for controlling the rotation of a shaft 102 is shown in FIGS. 1-4. The adaptive brake assembly 100 may generally be any apparatus which controls the rotation of a shaft. The adaptive brake assembly 100 may be used to control the descent speed of an individual. The adaptive brake assembly may be a stand-alone device or the adaptive brake assembly may be a component of an emergency escape system. The emergency escape system may include a harness and a cable wound about the shaft, such that the shaft is rotated due to the torque applied from the weight of an individual in the harness descending from a height. The emergency escape system may be incorporated into a window unit or may be a stand-alone device.

The adaptive brake assembly 100 includes a center hub 104, one or more flyweights 106, one or more adaptive mechanisms 108 (e.g., leaf springs), a drum 132, and one or more friction members 136 that engage the drum 132 upon rotation of the flyweights 106. A shaft 102 extends through and is connected to the center hub 104. In some embodiments, the adaptive brake assembly 100 includes the shaft 102 and, in other embodiments, the shaft 102 is not part of the adaptive brake assembly 100. As discussed further below, the adaptive mechanisms 108 (e.g., leaf springs) may vary (e.g., non-linearly vary) the angle of the force applied to the flyweights 106 based on a torque applied to the center hub 104. In the illustrated embodiment, the adaptive mechanism 108 is a leaf spring 108. Each leaf spring 108 is disposed between the center hub 104 and a flyweight 106. As shown, each leaf spring 108 is connected to the center hub 104 and contacts the flyweights 106 upon rotation of the center hub 104. In the illustrated embodiment, the brake assembly 100 includes first and second flyweights 106 and first and second leaf springs 108. The first and second flyweights 106 and leaf springs 108 are generally identical. Description herein of one flyweight or leaf spring should generally be understood to apply to the other flyweight or leaf spring unless stated otherwise.

The shaft 102 and center hub 104 rotate about a center axis $A_{102}$. The flyweights 106 are each pivotally connected to a flybar 126 and pivot about a flyweight axis $A_{106}$ which is parallel to the center axis $A_{102}$. Rotation of the center hub 104 causes the flyweights 106 to rotate about the center axis $A_{102}$. In the illustrated embodiment, each of the flyweights 106 comprises a curved surface 110. Each leaf spring 108 contacts a curved surface 110 as the center hub 104 rotates such that the leaf spring 108 exerts a spring contact force $F_s$ (shown in FIGS. 3 and 4) on the flyweights 106 as the center hub 104 rotates, causing the flyweights 106 to rotate about the center axis $A_{102}$.

Figure 3:
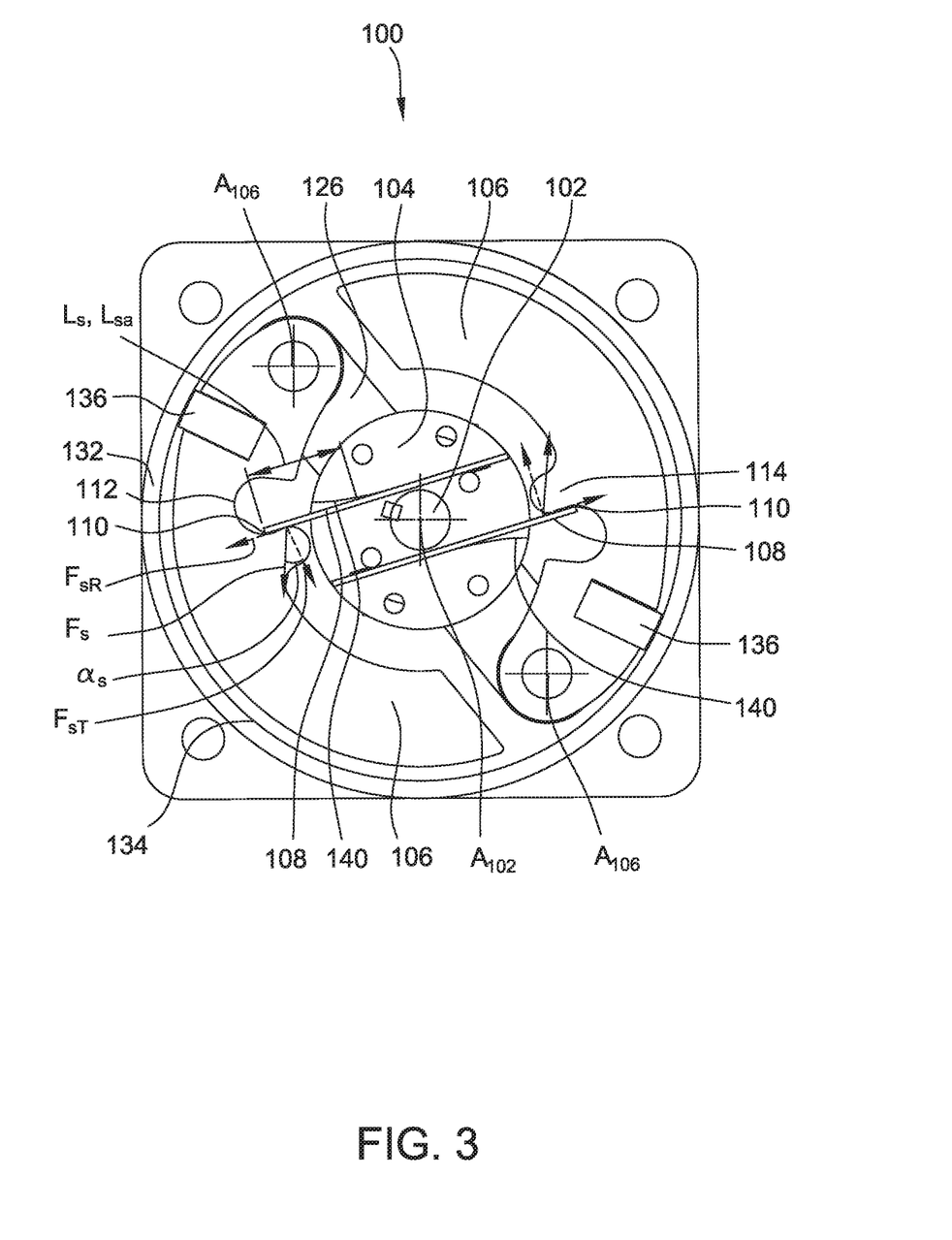
FIG. 3 is a front view of the adaptive brake assembly with the first end cap removed and the first flybar removed therefrom, and the leaf spring is in a first position.
Figure 4:
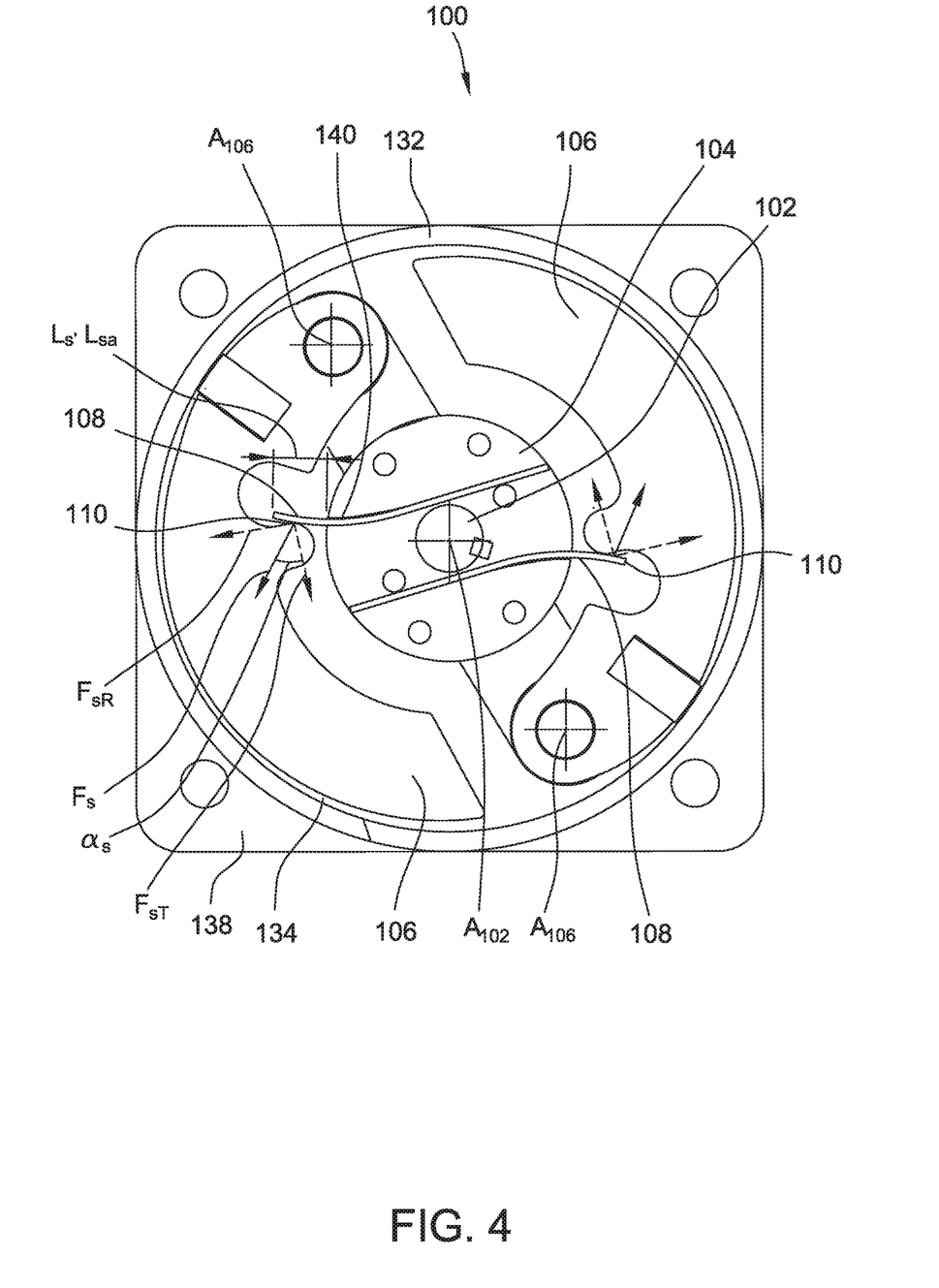
FIG. 4 is a front view of the adaptive brake assembly of FIG. 3, with the leaf spring in a second position.

Each curved surface 110 defines a recess 112 and the leaf spring 108 extends into the recess 112. The curved surface 110 may define a projection 114 of the flyweight 106. The leaf spring 108 is capable of deflecting such that the portion of the curved surface 110 that contacts the leaf spring 108 changes with the deflection of the leaf spring 108. The curved surface 110 may be convex. In other embodiments, the curved surface 110 may be a straight edge or include any shape which enables contact between the curved surface 110 and the leaf spring 108.

Figure 2:
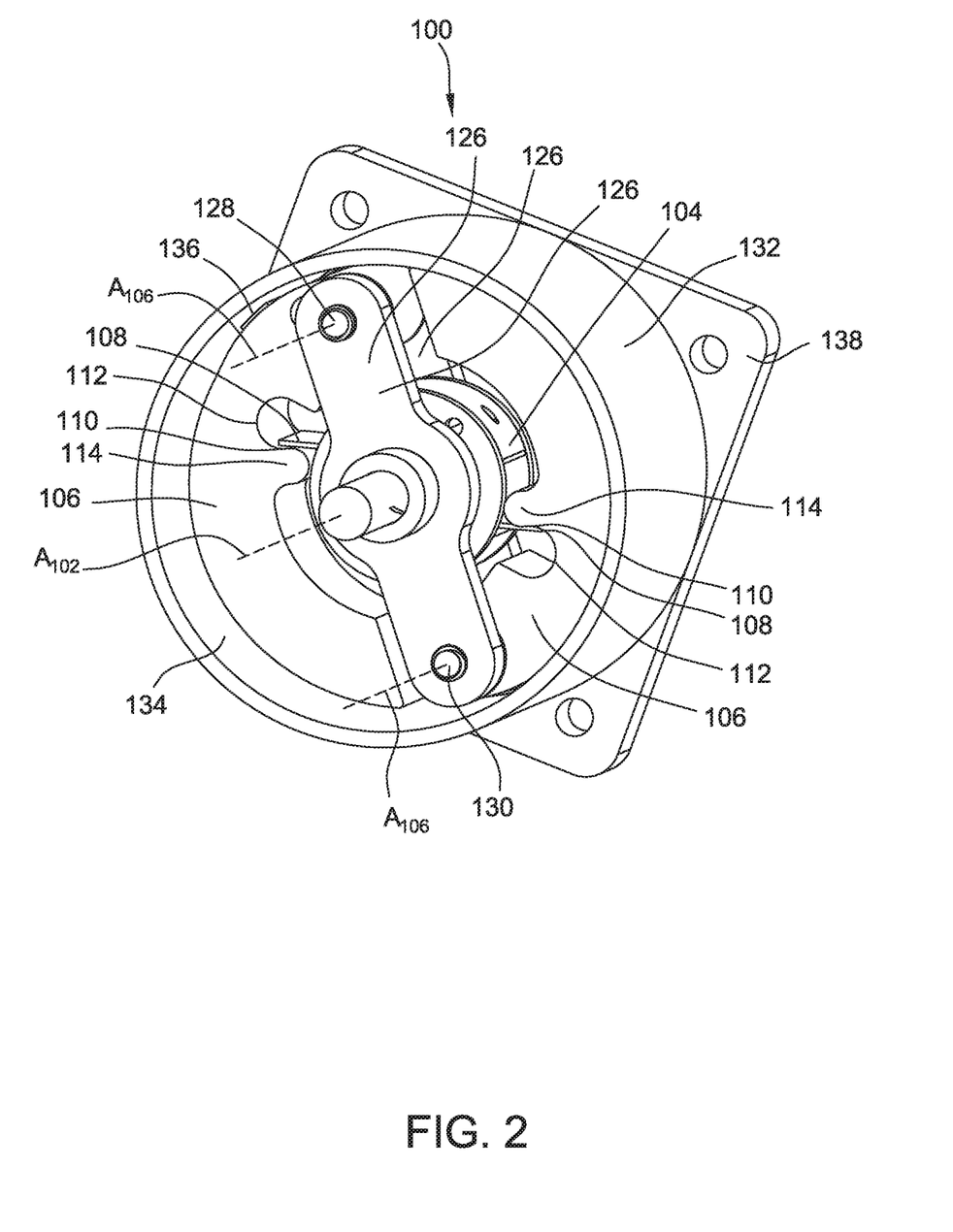
FIG. 2 is a perspective view of the adaptive brake assembly with the first end cap removed therefrom.

The adaptive brake assembly 100 includes first and second flybars 126 (FIG. 2). The flybars 126 are disposed opposite each other across the hub 104. Each flybar 126 is freely rotatable about the shaft 102. Each flyweight 106 is pivotally attached to both flybars 126 at the flyweight axis $A_{106}$. The first flyweight 106 is pivotally connected to the flybars 126 toward first ends 128 of the flybars 126. The second flyweight 106 is pivotally connected to the flybars 126 toward second ends 130 of the flybars 126.

Figure 1:
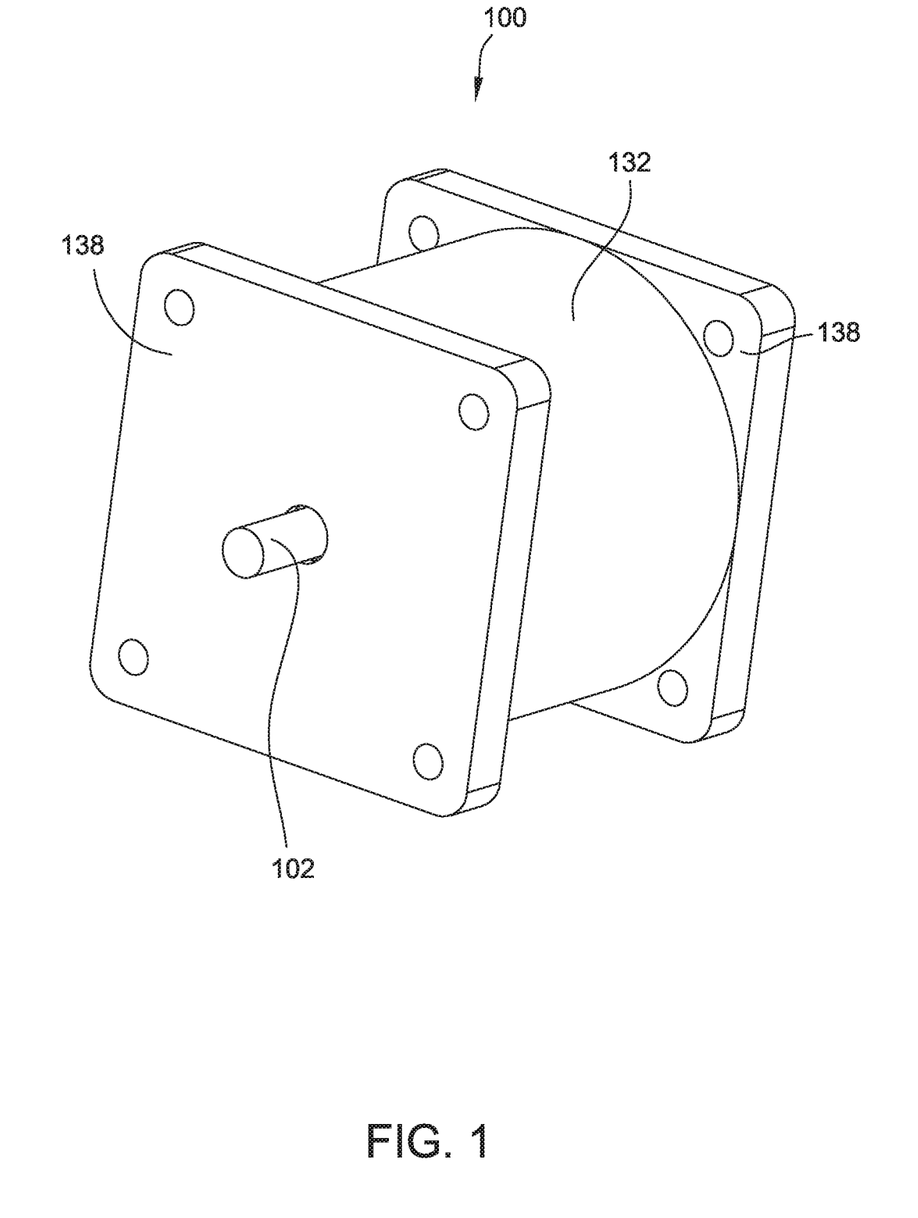
FIG. 1 is a perspective view of an example embodiment of the adaptive brake assembly.

In the illustrated embodiment, the adaptive brake assembly 100 includes a drum 132 and first and second end caps 138. Each end cap 138 may be used to support the drum 132 and enable the adaptive brake assembly 100 to be mounted to a structure. The center hub 104 and the flyweights 106 are disposed within the drum 132. The drum 132 may be stationary relative to the center hub 104 and the flyweights 106. In some embodiments, the end caps 138 maintain the position of the drum 132 relative to the flyweights 106 and the center hub 104. The drum 132 includes an inner surface 134. Each flyweight 106 includes a friction member 136 connected thereto. The friction members 136, connected to the flyweights 106, may be in contact (or caused to be in contact upon rotation of the shaft 102) with the inner surface 134 of the drum 132 as the center hub 104 rotates generating a friction force that acts to oppose the rotation of the center hub 104 and the shaft 102. The friction members 136 may be one of a brake pad or a brake shoe. In alternative embodiments, the friction member 136 may include any structure including a material allowing for frictional engagement with the drum 132. The friction member 136 and/or drum 132 may have a relatively high coefficient of friction to allow the brake assembly 100 to be relatively sensitive but not too high such that the brake assembly 100 becomes self-locking.

In the illustrated embodiment, the adaptive brake assembly 100 includes an adaptive braking force which acts to control the rotation of the center hub 104 and the shaft 102. The magnitude of the braking force adapts to changes in the rotational speed of the center hub 104 and shaft 102. The rotational speed of the center hub 104 may increase as the applied torque on the shaft 102 increases. For example, the applied torque on the shaft 102 may be result of an individual descending from a height using a rope or wire wound about the shaft 102. Individuals with higher bodyweight may generate higher applied torques on the shaft 102 than individuals with lower bodyweights. Higher torques increases the rotational speed of the shaft 102, increasing the descent speed of the person. The adaptive braking force may control the rotational speed of the shaft 102 regardless of the applied torque. For example, the adaptive braking force may control the speed of descent of individuals ranging in bodyweights such that a relatively consistent descent speed is achieved independent of bodyweight.

In the illustrated embodiment, the adaptive braking force is created, at least in part, by the friction force generated by the contact between the friction members 136 and the inner surface 134 of the drum 132. The friction force is dependent on a drum 132 contact force, which is the contact force between the friction members 136 and the inner surface of the drum 132. The braking force increases with increasing drum contact force. The drum contact force is, at least in part, generated by the spring contact force $F_s$ and a centrifugal force.

The angle of the spring contact force Fs exerted on the flyweights 106 changes based on the deflection of the leaf spring 108. For example, the angle of the spring contact force Fs depends on the deflection of the leaf spring 108 and a spring stiffness parameter. The leaf spring 108 may include any structure in which the angle of the leaf spring contact force $F_s$ exerted on the curved surface 110 depends on the deflection of the structure. Specifically, the angle of the spring contact force Fs increases with increases in deflection. In some example embodiments, the leaf spring 108 may be a beam having a substantially constant cross-section along its length, a tapered beam, a variable shaped beam, and/or a tapered spring.

In some embodiments, the spring stiffness parameter is non-linear, such that the angle of the spring contact force $F_s$ exerted by the leaf spring 108 depends non-linearly on the deflection of the leaf spring 108. For example, the angle of the spring contact force $F_s$ may equal a coefficient A multiplied by the amount of input moment with the coefficient A increasing with increased input moment.

In example embodiments, the adaptive brake 100 includes a leaf spring-engaging surface 140 (shown as part of the center hub 104 in FIG. 3). The amount of leaf spring-engaging surface 140 that contacts the leaf spring 108 changes, at least in part, with the moment applied to the center hub 104. For example, as the moment applied to the center hub 104 increases, the leaf spring 108 increases in deflection such that the amount of leaf spring-engaging surface 140 increases.

In this example embodiment, the leaf spring-engaging surface 140 is a curved surface of the center hub 104. The amount of leaf spring-engaging surface 140 that contacts the leaf spring 108 increases with increased deflection of the leaf spring 108. The amount of leaf spring-engaging surface 140 contributes to the spring stiffness parameter.

The leaf spring 108 includes a free length $L_s$, which is the portion of the leaf spring not engaged with the leaf spring-engaging surface 140. As the amount of leaf spring-engaging surface 140 increases, the free length decreases (as depicted in FIG. 4), thereby increasing the spring stiffness parameter of the leaf spring 108. In FIG. 3 the leaf spring 108 is in a first position, wherein the leaf spring 108 is approximately in a non-deflected position such that there is limited contact between the leaf spring 108 and the leaf spring-engaging surface 140. In the first position, the leaf spring 108 has a first free length of $L_{s4}$. In FIG. 4, the leaf spring 108 is in a second position, such that the leaf spring 108 is deflected and there is greater contact between the leaf spring 108 and the leaf spring-engaging surface 140 than in the first position. In the second position, the leaf spring 108 has a second free length of $L_{s3}$. The second free length $L_{s3}$ is less than the first free length $L_{s4}$, such that the spring stiffness parameter is greater in the second position than in the first position. In some embodiments, the leaf spring 108 may be a cantilever beam including a stiffness parameter which depends on the free length of the beam. The stiffness parameter increases with decreases the free length of the cantilever beam.

In this illustrated embodiment, the spring contact force $F_s$ acts along a contact angle $\alpha_s$ through the point of contact between the curved surface 110 and the leaf spring 108. The contact angle is dependent, at least in part, by the deflection of the leaf spring 108. The contact angle $\alpha_s$ is directed such that the spring contact force $F_s$ includes a radial component $F_{sR}$ and a tangential component $F_{sT}$ perpendicular to the radial component $F_{sR}$. The tangential component $F_{sT}$ causes the flyweights 106 to rotate about the center axis $A_{102}$. The radial component $F_{sR}$ causes the flyweights 106 to rotate about the flyweight axis $A_{106}$. The magnitude of the radial component $F_{sR}$ and the tangential component $F_{sT}$ change based on, at least in part, the rotational speed of the center hub 104. Specifically, as the deflection of the leaf spring 108 changes, the contact angle $\alpha_s$ changes, thereby changing the relative magnitudes of the tangential component $F_{sT}$ and the radial component $F_{sR}$. For example, as the leaf spring 108 deflection increases, the contact angle $\alpha_s$ changes such that the magnitude of the radial component $F_{sR}$ increases, and the magnitude of the tangential $F_{sT}$ component remains constant.

The centrifugal force is generated by the rotation of the flyweights 106 about the center axis $A_{102}$. The centrifugal force acts from the center of gravity of the flyweights 106 along a direction towards the inner surface 134 of the drum 132. The centrifugal force causes the moments applied to the flyweight 106 (and the restoring force) to increase. As the rotational speed of the center hub 104 increases, the rotational speed of the flyweight 106 increases, increasing the centrifugal force. The centrifugal force increases the drum contact force and results in an increase in the braking force.

The radial component $F_{sR}$ of the spring contact force $F_s$ causes the flyweights 106 to pivot about the flyweight rotational axis $A_{106}$, such that at least a portion of the flyweights 106 and the friction member 136 move outward from the center hub 104 towards the inner surface 134 of the drum 132, increasing the drum contact force. In addition, the magnitude of the radial component $F_{sR}$ increases as the moment applied to the center hub 104 increases. For example, as the moment applied to the center hub 104 increases, the deflection of the leaf spring 108 increases, causing an increase in the magnitude of the radial component $F_{sR}$ of the spring contact force $F_s$, thereby increases the braking force of the adaptive brake assembly 100.

The leaf spring 108 of the adaptive brake assembly 100 acts as a biasing member. In other embodiments, the biasing member 108 is a spring such as a torsion spring, extension spring or clock spring. The biasing member 108 is connected to the center hub 104 and contacts a flyweight 106. In some embodiments, the biasing member 108 is connected to a single flyweight and not connected to both flyweights 106. The biasing member 108 contacts a curved surface 110 of one or more of the flyweights 106. The biasing member may be an adaptive mechanism (e.g., spring-leaf) that non-linearly varies a force applied to the inner surface 134 of the drum 132 by the friction member 136 based on a torque applied to the center hub 104.

Figure 5:
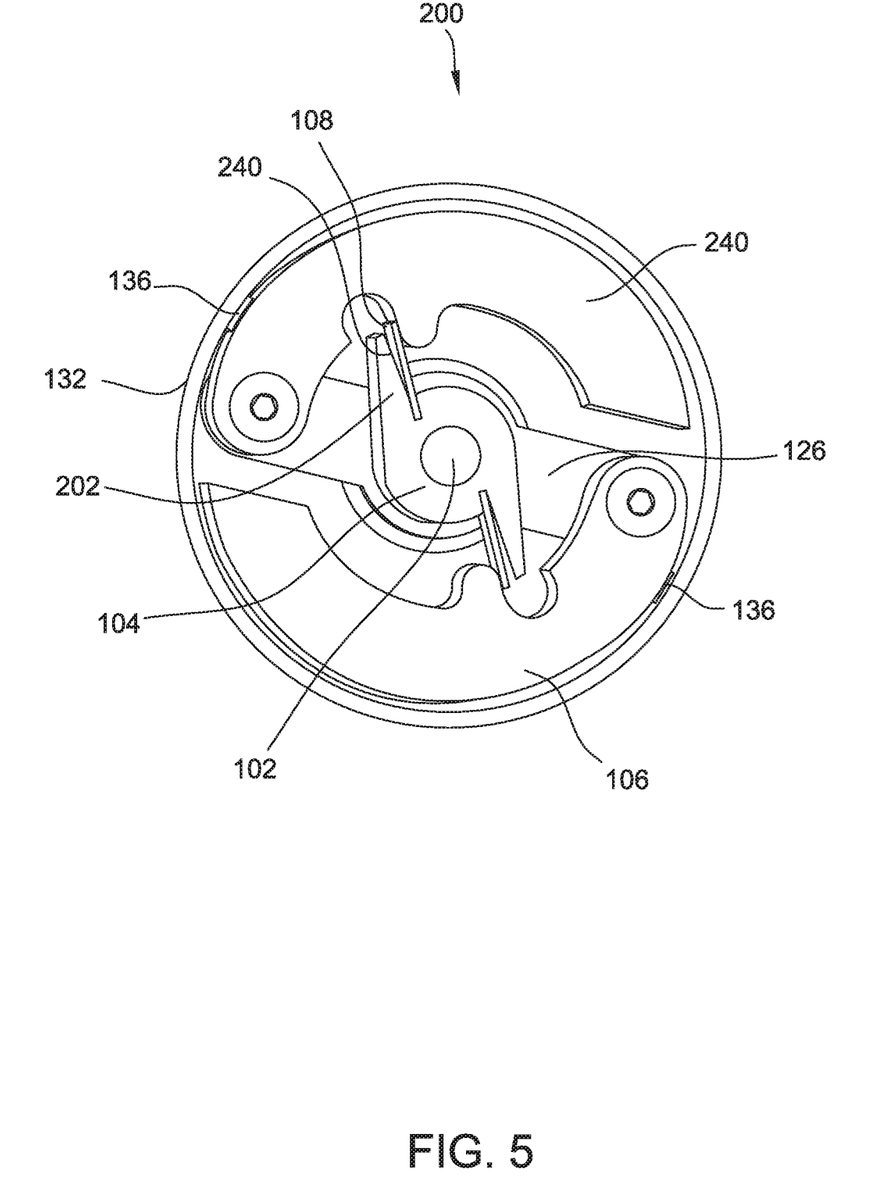
FIG. 5 is a front view of another example embodiment of an adaptive brake system.

In another example embodiment, an adaptive brake assembly 200 (FIG. 5) may include a tab 202 extending from the center hub 104. The tab 202 may include a surface having a similar shape to the leaf spring 108, such that as the leaf springs 108 deflect, at least a portion of the leaf spring 108 contacts at least a portion of the surface of the tab 202. The tabs 202 are shaped such that the spring parameter is non-linear, such that the angle of the spring contact force $F_s$ is non-linearly related to the moment applied to the center hub 104. In this example embodiment, the tabs 202 include a leaf spring-engaging surface 240, such that as the leaf spring 108 is deflected, at least a portion of the leaf spring 108 is in contact with the leaf spring-engaging surface 240, thereby altering the spring stiffness parameter.

The adaptive brake assemblies 100, 200 may be used with an escape system for lowering a person down from a height. For example, a rope (e.g. a cable or the like) may be wound about the shaft 102, and the distal end of the rope may be used to support a harness for holding an individual. The shaft 102 may rotate as the individual in the harness descends. The shaft 102 may be connected to the adaptive brake assembly 100 such that the adaptive brake assembly 100 controls the rotational speed of the shaft 102 as the person descends. The rotational speed of the shaft 102, is at least partially, dependent on the weight of the individual. For example, as the weight of the individual increases, the applied torque on the shaft 102 increases, increasing the rotational speed of the shaft 102.

Compared to conventional brake assemblies, the brake assemblies of embodiments of the present disclosure have several advantages. The adaptive brake assembly generates an adaptive braking force to oppose the rotation of the shaft. The adaptive braking force generated by the adaptive brake assembly changes and adapts based on torques applied to the shaft and/or on the rotational speed of the shaft. The adaptive braking force enables the adaptive brake assembly to control the rotational speed of the shaft for various torques applied to the shaft. In embodiments in which the center hub includes a curved surface and a leaf spring which engages more of the curved surface upon deflection, the stiffness parameter of the leaf spring changes allowing the brake to be adaptive. In embodiments in the brake assembly is adaptive, the speed of the shaft may be bound by a relatively narrow range (e.g., and less dependent on the weight of an individual such as in a descender system).

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. An adaptive centrifugal brake assembly comprising:
a center hub;
first and second flyweights, wherein rotation of the center hub causes the first and second flyweights to rotate;
a flybar freely rotatable about a shaft, the first flyweight being pivotally connected to the flybar toward a first end of the flybar and the second flyweight being pivotally connected to the flybar toward a second end of the flybar;
a leaf spring disposed between the center hub and the first flyweight, the leaf spring non-linearly varying a force on the first flyweight as the center hub rotates;
a curved leaf-spring engaging surface that contacts the leaf spring, an amount of curved leaf-spring engaging surface that contacts the leaf spring during rotation of the center hub increasing with increased deflection of the leaf spring to vary a stiffness parameter of the leaf spring; and
a drum, the center hub, first and second flyweights, and leaf spring being disposed within the drum, the drum having an inner surface, wherein first and second friction members contact the inner surface of the drum upon rotation of the center hub, the drum being stationary relative to the center hub during contact of the first and second friction members with the inner surface of the drum, the first flyweight having the first friction member connected thereto and the second flyweight having the second friction member connected thereto.

2. The adaptive centrifugal brake assembly as set forth in claim 1 comprising a shaft connected to the center hub.

3. The adaptive centrifugal brake assembly as set forth in claim 1 wherein the first flyweight comprises a curved first flyweight surface, the leaf spring contacting the curved first flyweight surface as the center hub rotates.

4. The adaptive centrifugal brake assembly as set forth in claim 3 wherein the curved first flyweight surface defines a recess of the first flyweight, the leaf spring extending into the recess.

5. The adaptive centrifugal brake assembly as set forth in claim 3 wherein the curved first flyweight surface defines a projection of the first flyweight.

6. The adaptive centrifugal brake assembly as set forth in claim 3 wherein the leaf spring is a first leaf spring, the first leaf spring contacting the curved first flyweight surface, the centrifugal brake assembly comprising a second leaf spring, the second flyweight comprising a curved second flyweight surface, the second leaf spring contacting the curved second flyweight surface.

7. The adaptive centrifugal brake assembly as set forth in claim 1 wherein the leaf spring exerts a force on the first and second flyweights as the center hub rotates, the force including a radial component and a tangential component that change, based at least in part, on the speed of the rotation of the center hub, the angle of the force changing non-linearly based on the moment applied to the center hub, the magnitude of the radial component increasing while the magnitude of the tangential component remains constant as the leaf spring deflects.

8. The adaptive centrifugal brake assembly as set forth in claim 1 wherein the leaf spring is a cantilevered beam.

9. The adaptive centrifugal brake assembly as set forth in claim 1 further comprising an end cap for mounting the brake assembly to a structure, the end cap maintaining the position of the drum in a stationary position as the center hub rotates.

10. The adaptive centrifugal brake assembly as set forth in claim 9 wherein the end cap is connected to the drum.

11. The adaptive centrifugal brake as set forth in claim 1 wherein the center hub comprises the curved leaf-spring engaging surface.

* * * * *